(12) United States Patent
MacKarvich

(10) Patent No.: US 6,971,661 B1
(45) Date of Patent: Dec. 6, 2005

(54) TRAILER HITCH WITH SAFETY CABLE CARTRIDGE

(76) Inventor: Charles J. MacKarvich, 5901 Wheaton Dr., Atlanta, GA (US) 30336

( * ) Notice: Subject to any disclaimer, the term of this patent is extended or adjusted under 35 U.S.C. 154(b) by 0 days.

(21) Appl. No.: 10/894,615

(22) Filed: Jul. 20, 2004

(51) Int. Cl.$^7$ .............................................. B60D 1/28
(52) U.S. Cl. ..................................... 280/457; 28/480.1
(58) Field of Search ........................... 280/456.1, 457, 280/480, 480.1

(56) References Cited

U.S. PATENT DOCUMENTS

| | | | |
|---|---|---|---|
| 3,724,875 A * | 4/1973 | Hillman | 280/457 |
| 4,718,690 A * | 1/1988 | Baker | 280/480 |
| 6,035,977 A * | 3/2000 | Marasco | 188/112 R |
| 6,572,132 B1 * | 6/2003 | Saul | 280/480 |
| 6,581,952 B1 | 6/2003 | MacKarvich | 280/457 |
| 2003/0214115 A1 * | 11/2003 | Saul | 280/480.1 |

* cited by examiner

Primary Examiner—Kevin Hurley
(74) Attorney, Agent, or Firm—Thomas, Kayden, Horstemeyer & Risley, LLP

(57) ABSTRACT

A safety cable cartridge 20 is connected between a towing vehicle 12 having a hitch ball and a trailer 10 including a tubular coupler housing 16 mounted to a trailer draw bar. The cartridge is self contained and includes a cartridge housing 28 for positioning in the elongated opening of the coupler housing, at least one safety cable assembly 30 positioned in said cartridge housing, and spring 20 surrounds the cable 31 and biases the distal end 30 of the cable toward the cartridge housing.

15 Claims, 2 Drawing Sheets

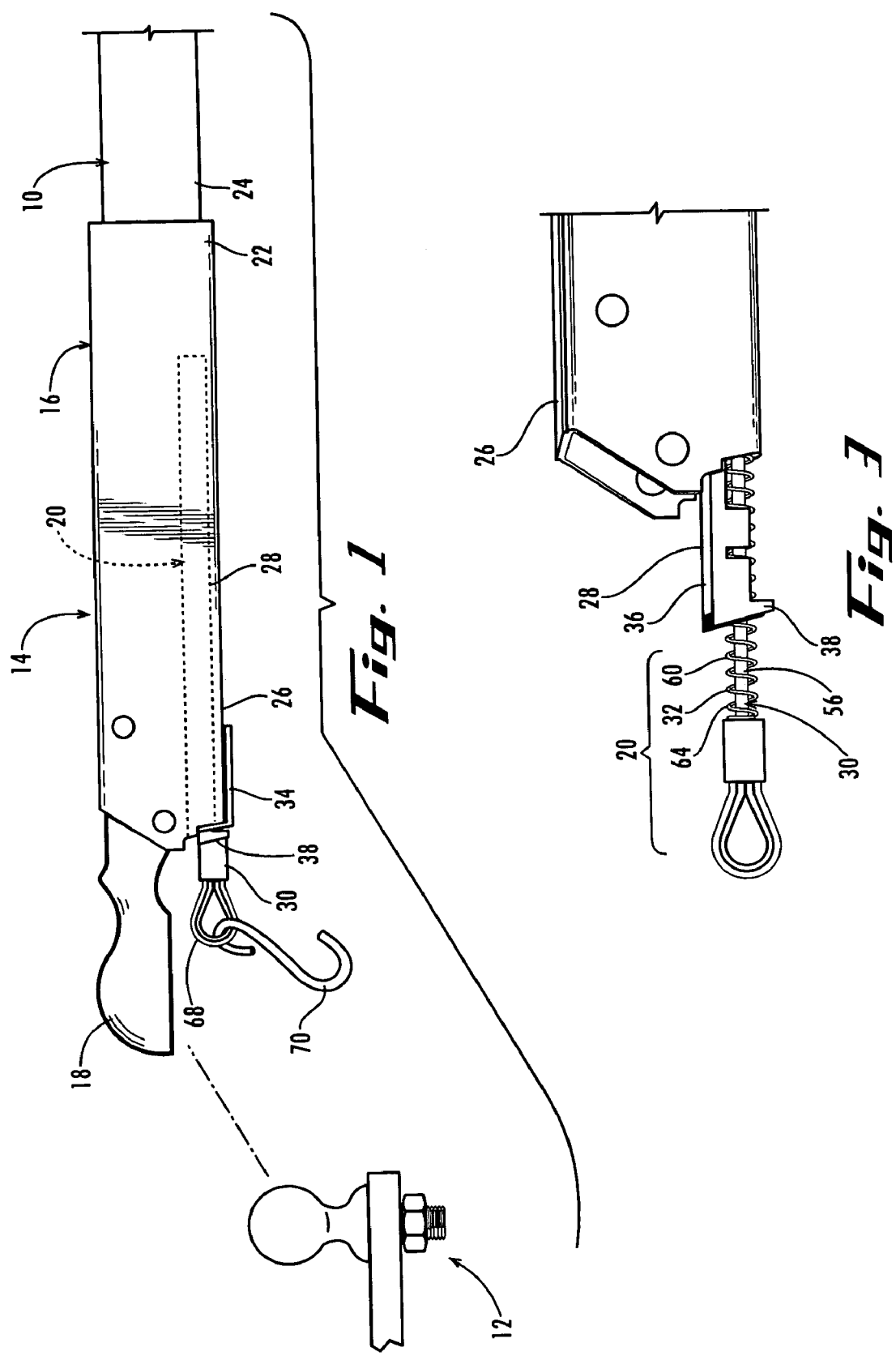

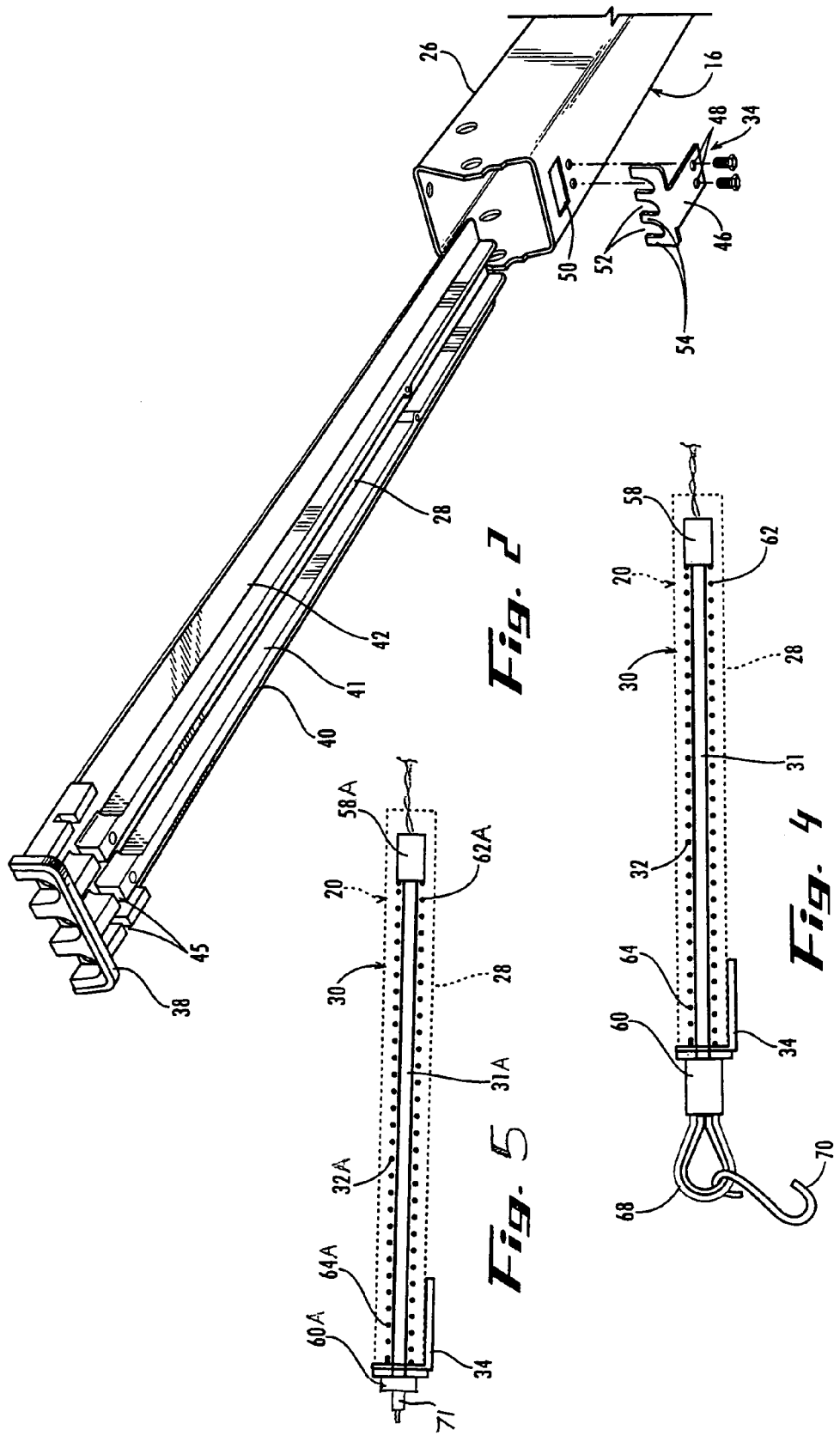

TRAILER HITCH WITH SAFETY CABLE CARTRIDGE

FIELD OF THE INVENTION

This invention concerns a trailer hitch that includes a hitch ball coupler for a trailer that is connectable to a hitch ball of a towing vehicle. More particularly, the invention includes a hitch ball coupler having safety cables that are retractable when the cables are disconnected from the towing vehicle.

BACKGROUND OF THE INVENTION

Prior art trailers typically include a hitch ball coupler that couples directly to the hitch ball of a towing vehicle and a pair of safety chains or cables that extend from the trailer to the hitch ball or to the vehicle itself. The purpose of the safety chains or cables is to make sure that the trailer does not accidentally separate from the towing vehicle in the event of the separation of the hitch ball coupler from the hitch ball of the towing vehicle.

Safety chains and cables are considered necessary because a hitch ball and hitch ball coupler must have universal motion in order for the towing vehicle and trailer to negotiate around curves and over hills, whereupon the longitudinal axes of the towing vehicle and trailer are not aligned and additional vertical and lateral forces might be applied to the trailer hitch. This relative motion between the trailer and the towing vehicle sometimes causes the hitch ball coupler to separate from the hitch ball. Also, there are times when the load carried by the trailer tends to cause the hitch ball coupler to lift upwardly away from the hitch ball, and there are other times when the application of the brakes of the towing vehicle applies so much stress to the hitch ball and hitch ball coupler that separation of the trailer from the towing vehicle becomes more likely.

In spite of the safety chains and cables being a necessary safety feature for a trailer, they are considered by many people to be obnoxious and unsightly. The cables tend to droop from the trailer toward the towing vehicle when the trailer is mounted to the towing vehicle, or droop from the trailer to the ground when the trailer is disconnected from the towing vehicle.

Also, when the trailer is moved away from the towing vehicle, the safety chains that are not connected to the hitch ball have the hazard of dragging on the ground or obstructing the movement of personnel or equipment about the trailer tongue.

Retractable safety cables for trailer hitches have been developed in the prior art. For example, my prior U.S. Pat. No. 6,581,952 discloses a trailer hitch that includes a hitch ball coupler housing mounted to the tongue or draw bar of a trailer and having tubular cable housings formed at the lower edge portions of the coupler housing. The safety cables are retractably mounted within the tubular cable housings, with coil springs urging the cables into the tubular cable housings. When the hitch ball coupler housing is mounted to the hitch ball of the towing vehicle, the safety cables can be pulled against the bias of their springs out of their tubular cable housings, and the hooks at the distal ends of the cables can be connected to the towing vehicle.

While this arrangement and other prior art retractable cable arrangements solve some of the problems identified above, they usually require additions to or structural modifications of the shape of the hitch ball coupler housing, such as the forming of tubular cable housings at the edge portions of the elongated coupler housing of the hitch ball coupler. Also, if the tubular cable housings and/or retractable cables within the tubular cable housings become inoperable, due to external impact, debris or deterioration within the cable housings, or damage to the cables, etc., the hitch ball coupler housing might require replacement or extensive repair.

It is to the solution to these problems that this invention is directed.

SUMMARY OF THE INVENTION

Briefly described, the present invention comprises a hitch ball coupler assembly for a trailer that is to be connected to a hitch ball of a towing vehicle, whereby the conventional safety chains or cables of the coupler are replaced with retractable safety cables that can be distended for connection to the hitch ball and retracted for safe, compact and visually pleasing storage. The coupler assembly includes a tubular coupler housing that has a proximal end rigidly mounted to the distal end of the draw bar or tongue of a trailer, and a distal end that supports the hemispherical hitch ball socket that fits about the hitch ball of the towing vehicle. A safety cable cartridge is mounted in the distal end of the hitch ball coupler housing, at a level lower than the hitch ball socket. The cartridge is self-contained in that it includes a support tray that is sized and shaped to snugly fit within the distal end of the hitch coupler housing and the support tray has elongated channels for receiving the safety cables and their coil compression springs that bias the safety cables within the cartridge.

The support tray of the safety cable cartridge includes an elongated channel for each safety cable. A spring anchor bracket is provided for the springs that permits longitudinal movement of the cables out of and into the cartridge while retaining the distal ends of the springs in a stationary position in the support tray. The proximal end of each spring is movable with the proximal end of its safety cable, tending to bias the safety cable into its retracted position within the safety cable cartridge.

A feature of the invention is that the coupler housing of the hitch ball coupler is of a simple design that does not require any special tooling for mounting the safety cable cartridge. Another feature of the invention is that the safety cable cartridge is formed separately of the hitch ball coupler, is self contained, and is easily mounted inside the coupler housing. The placement of the safety cable cartridge in the coupler housing maintains the cartridge in a shielded position where it is protected from impact from exterior contact. Also, the cartridge can be easily withdrawn from within the coupler housing for maintenance, repair or replacement. Also, the placement of the safety cable cartridge in the interior of the coupler housing conceals it from view, providing an uncluttered, neat appearance at the hitch ball coupler.

Because of the continuous bias of the safety cables into the safety cable cartridge at the distal end of the hitch ball coupler, there will normally be no slack in the cables as they extend from the safety cable cartridge to the hitch ball. Also, as the trailer and towing vehicle pivot with respect to each other, as when the trailer is being driven around a curve or being moved rearwardly at an angle with respect to the towing vehicle. When the trailer and its towing vehicle pivot, the springs of the safety cables will allow more or less of the cables to extend from the cartridge so as to compensate for the greater or shorter distances created between the safety cable cartridge and the point of connection of the cable to the hitch ball.

Thus, it is an object of this invention to provide a trailer with an improved hitch ball coupler for the draw bar of the trailer, for connection to the hitch ball of a towing vehicle, whereby safety cables are provided in a self contained safety cable cartridge that is removably mounted to the ball coupler housing.

Another object of this invention is to provide an improved trailer hitch that includes a safety cable cartridge that is separately mountable to and demountable from the draw bar of a trailer.

Another object is to provide a safety cable cartridge for mounting to a trailer.

Other objects, features and advantages of the present invention will become apparent upon reading the following specification, when taken in conjunction with the accompanying drawings.

BRIEF DESCRIPTION OF THE DRAWINGS

FIG. 1 is a side view of the hitch ball coupler, hitch ball and the safety cable cartridge installed in the hitch ball coupler housing.

FIG. 2 is a bottom perspective view of the distal end of the ball coupler housing, the tray of the safety cable cartridge extended from within the coupler housing, and the anchor bracket.

FIG. 3 is a side view of the coupler housing with the tray of the cartridge partially installed within the coupler housing, and with a safety cable and its coil compression spring partially inserted in the tray of the cartridge.

FIG. 4 is a side view of a safety cable and its spring and the anchor bracket.

FIG. 5 is a side view of the electrical harness, including it's spring and anchor bracket.

DETAILED DESCRIPTION

Referring now in more detail to the drawings, in which like numerals indicate like parts throughout the several views, FIG. 1 illustrates a draw bar or tongue 10 of a trailer that is to be connected to a hitch ball 12 of a towing vehicle. The hitch ball coupler 14 includes coupler housing 16, ball receptacle 18 and safety cable cartridge 20.

The coupler housing 16 is of tubular, rectangular in cross-section, configuration having opposed top and bottom walls 23A and 23B, and opposed side walls 23C and 23D, with its proximal end 22 mounted about the distal end 24 of draw bar 10 with a telescopic fit. The ball receptacle 18 is mounted to the distal end 26 of coupler housing 16.

As shown in FIGS. 2 and 3, safety cable cartridge 20 includes support tray 28, at least one safety cable assembly 30, with each safety cable assembly including safety cable 31 and a coil compression spring 32 that surrounds the safety cable. A spring anchor bracket 34 holds the distal end of the spring in the support tray 28, as will be described in more detail hereinafter.

Support tray 28 is of a width that matches the interior width of the tubular coupler housing 16 so that it fits snugly in the opening of the tubular coupler housing, and the support tray includes a relatively flat top wall 36, with an enlarged breadth end collar 38 formed at the distal end of the tray, and a plurality of cable channels 40, 41 and 42 extending parallel to one another and forming the bottom of the support tray 28. The cable channels 40–42 of the support tray face the bottom wall 23B of the coupler housing and extend through the end collar 38, and anchor slots 44 intersect each cable channel 40–42 adjacent the end collar.

Spring anchor bracket 34 is of L-shaped configuration having a fastener plate 46 arranged to abut and be fastened to the bottom wall of the tubular coupler housing 16, with openings 48 for receiving connector screws that pass through the anchor bracket 34 and the bottom wall of the coupler housing. The other portion of the L-shaped anchor bracket 34 is the retainer plate that extends 90 degrees from the fastener plate. The retainer plate is formed with a plurality spring retaining prongs 54 that are sized and shaped to abut the ends of the springs 32 and that define cable passage slots 52 there between that allow the cables 31 to pass between the prongs.

One or more safety cable assemblies 30 are positioned in the channels 40–42 of the support tray 28. Usually a pair of safety cable assemblies are used. As shown in FIG. 4 each safety cable assembly includes a cable 31 having an enlarged proximal end 58 and an enlarged distal end 60. The coil compression spring 32 surrounds the length of cable 31, and the proximal end 62 of the spring is operatively connected to the proximal end 58 of the length of cable 31. The spring distal end 64 engages spring anchor bracket 34, and spring anchor bracket 34, being fastened to the tubular coupler housing bottom wall, retains the spring in the support tray 28. The proximal end 58 of the safety cable 31 is of enlarged breadth so as to avoid movement of the spring about the enlarged end, thereby effectively fastening the proximal end of the spring to the proximal end of the safety cable. Also, the enlarged proximal end 58 of cable 31 is of greater breadth than the slots 52 in the spring anchor bracket, thereby blocking movement of the cable out of the support tray 28.

The other or distal end 60 of the cable 31 has a similar enlargement that is of greater breadth than the cable and greater breadth than the cable channels 40–42 and the openings through the end collar 38, so that the spring cannot move the enlargement 60 into the confines of the support tray 28.

A loop 68 is fastened to the distal end 60 of the safety cable 31, and a hook 70 is mounted to the loop.

It can be understood that the support tray 28 functions as a cartridge housing, and the spring anchor bracket 34 functions as a spring anchor.

It will be noted that the safety cable cartridge 20 includes the support tray 28, the safety cable assemblies 30, with each safety cable assembly including a safety cable 31, its surrounding coil spring 32, the spring anchor bracket 34, the loop 68 and the hook 70. Typically two of the safety cable assemblies 30 will be positioned in the cable channels 40 and 42. Spring anchor bracket 34 is inserted into the anchor bracket slots 45 so that the anchor bracket retains the cable and the spring in place within the support tray 28, so that the cartridge is self contained before it is to be placed in the coupler housing 16.

Upon inserting a safety cable cartridge 20 in a coupler housing 16, the worker will retrieve the self contained cartridge and remove the spring anchor bracket from the tray. The worker then slides the cartridge into the exposed open end of the coupler housing 16 until the end collar 38 abuts the lower and side walls of the coupler housing 16. The worker then replaces the spring anchor bracket 34 through the aligned bottom slot 50 of the coupler housing 16 and the anchor slots 45 and locates the prongs 54 about the safety cables 31. The worker then screws the spring anchor bracket to the outer surface of the coupler housing. Therefore, the spring anchor bracket functions as an anchor that holds the support tray 28 in a fixed position within the coupler housing 16, and limits the spring distal end 64 from moving out of the safety cable cartridge 20.

When the trailer operator of the trailer wishes to connect the safety cables to the vehicle 12, the operator simply pulls on the loop 68 and hook 70, drawing the safety cable 56 from the support tray 28 until the hook 70 reaches the portion of the vehicle to which the hook is to be attached. When the operator has attached the hook to the vehicle, the coil compression spring tends to retract the cable back into the support tray 28 until all of the slack in the cable has been taken up.

If any portions of the safety cable cartridge becomes damaged, the safety cable cartridge 20 can be removed by disconnecting the anchor bracket 34, by removing the screws from the openings 48 of the anchor bracket 34, and withdrawing the anchor bracket from the support tray 28 and the bottom wall of the coupler housing 16. This permits the safety cable cartridge to be withdrawn from the coupler housing and replaced with another cartridge.

While the foregoing disclosure involves the mounting of safety cables in cartridge form to a trailer, other similarly shaped items can be mounted in the cartridge. For example, an electrical harness can be installed as described for safety cables. The cartridge has three channels, and safety cables can be mounted in the side channels and an electrical harness mounted in the middle channel.

As shown in FIG. 5, the electrical harness 71 is mounted centrally along the length of safety cable assembly 30. The harness includes an electrical conductor 31A, with coil compression spring 32A surrounding the conductor, and the spring and conductor are located in the support tray 28 at the central channel 41 of support tray 28. The spring distal end 64A bears against the spring anchor bracket 34 while the proximal end 62A bears against the enlarged proximal end 58A of the harness. The harness 71 includes a plug at its distal end and it functions in substantially the same way as the safety cable 31, in that when the harness 71 is withdrawn from the support tray 28, the coil compression spring 32A is compressed against its bias by enlarged proximal end 58A. When the harness is unplugged from the towing vehicle, it is urged back into its retracted position by the spring, as shown in FIG. 5.

Although a preferred embodiment of the invention has been disclosed in detail herein, it will be obvious to those skilled in the art that variations and modifications of the disclosed embodiment can be made without departing from the spirit and scope of the invention as set forth in the following claims.

What is claimed is:

1. A safety cable cartridge for connection between a towing vehicle having a hitch ball and a trailer including a coupler housing mounted to a tubular trailer draw bar of the trailer and extending forwardly from the trailer and defining an elongated opening therein sized and shaped for mounting therein a ball receptacle, said cartridge comprising:
   an elongated support tray for positioning in the elongated opening of the coupler housing,
   a safety cable assembly positioned in said support tray comprising:
      a safety cable having a proximal end and a distal end,
      a coil compression spring surrounding said cable, said spring having a proximal end and a distal end,
      said proximal end of said cable operatively connected to said proximal end of said spring and movable in unison with said proximal end of said spring along the length of said cartridge housing,
      a spring anchor positioned at the distal end of said spring for retaining the distal end of said spring in said cartridge housing,
      said support tray defining an elongated groove therein and said cable and spring are received in and movable along said groove,
      such that as the distal end of the cable is moved out of the cartridge for connection to a hitch of a towing vehicle, the proximal end of said cable compresses the spring and the spring biases the distal end of the cable back toward the coupler housing.

2. The safety cable cartridge of claim 1, wherein said cartridge is self contained and is configured for releasably mounting in the coupler housing.

3. The hitch assembly of claim 1, and further including a hook connected to the distal end of said cable.

4. A safety cable cartridge for connection between a towing vehicle having a hitch ball and a trailer including a coupler housing mounted to a tubular trailer draw bar of the trailer and extending forwardly from the trailer and defining an elongated opening therein for receiving a ball receptacle, said cartridge comprising:
   an elongated support tray for positioning in the elongated opening of the coupler housing,
   a safety cable assembly positioned in said support tray comprising:
      a safety cable having a proximal end and a distal end,
      a coil compression spring surrounding said cable, said spring having a proximal end and a distal end,
      said proximal end of said cable operatively connected to said proximal end of said spring and movable in unison with said proximal end of said spring along the length of said cartridge housing,
      a spring anchor positioned at the distal end of said spring for retaining the distal end of said spring in said cartridge housing,
      such that as the distal end of the cable is moved out of the cartridge for connection to a hitch of a towing vehicle, the proximal end of said cable compresses the spring and the spring biases the distal end of the cable back toward the coupler housing,
   said cartridge being of a breadth to snugly fit into the elongated opening of said tubular coupler housing, said spring anchor bracket extending through said coupler housing, through said support tray and into engagement with said spring.

5. A self contained safety cable cartridge adapted for insertion into an elongated opening of a tubular coupler housing of a trailer, said cartridge including:
   a cartridge housing configured of a breadth to snugly fit into the elongated opening of said tubular coupler housing,
   said cartridge housing defining at least two elongated parallel grooves therein,
   a retractable cable assembly positioned in each groove of said cartridge housing, said retractable cable assemblies each including a cable having a distal end movable toward and away from said cartridge housing and a proximal end movable in one of the grooves of said cartridge housing, and
   a spring connected to said cable and configured to bias the distal end of said cable toward the cartridge housing.

6. The safety cable cartridge of claim 5, wherein said spring is positioned in a groove of said cartridge housing.

7. The safety cable cartridge of claim 5, wherein a hook is mounted to the distal end of said cable.

8. The safety cable cartridge of claim 5, further including:
a spring anchor connecting said spring to said safety cable cartridge housing.

9. The safety cable cartridge of claim 5, and wherein said spring anchor includes:
   a bracket mounted to said coupler housing and extending through said coupler housing and into said cartridge housing.

10. The safety cable cartridge of claim 5, and wherein said spring is a coiled compression spring surrounding said cable.

11. The safety cable cartridge of claim 5, wherein said cartridge housing, spring and cable are configured for insertion into the opening of the cartridge housing.

12. A self contained safety cable cartridge configured for support by a trailer tongue,
   said safety cable cartridge including a cartridge housing,
   a pair of safety cable assemblies positioned in said cartridge housing,
   each said safety cable assembly including:
      a cable including a distal end distendable from said cartridge housing,
      a connector mounted on said distal end of said cable for connection to a towing vehicle,
      a spring surrounding said cable and connected between said cartridge housing and said safety cable for retracting said cable into said cartridge housing, and
      a spring anchor connected between said cartridge housing and said spring configured to retain the spring in the cartridge housing.

13. A self contained safety cable cartridge of claim 12, wherein said cartridge housing defines at least two parallel grooves therein, and said safety cable assemblies each include a cable and a spring positioned in the grooves.

14. A safety cable cartridge of claim 12, and wherein said cartridge housing defines at least three parallel grooves therein, a cable and spring positioned in two of the grooves and an electrical harness positioned in the other of the grooves.

15. Apparatus for mounting safety cables to a trailer draw bar, comprising:
   a coupler housing for mounting to the draw bar of a trailer,
   a cartridge housing received in the coupler housing,
   a pair of cables positioned in said cartridge housing, each of the cables having distal ends movable between positions retracted toward said cartridge housing and distended from said cartridge housing,
   a spring connected to each of said cables for biasing the cables from their respective distended positions to their respective retracted positions,
   a spring anchor connected to said cartridge housing and to said spring for holding said spring in said cartridge housing, and
   an electrical harness positioned in said cartridge housing movable between positions retracted in and distended from said cartridge housing, and
   a harness spring connected between said cartridge housing and said harness for biasing said harness from its distended position to its retracted position.

* * * * *